(12) United States Patent
Wallentin

(10) Patent No.: US 6,246,878 B1
(45) Date of Patent: Jun. 12, 2001

(54) MAGNETORESISTIVE DEVICE HAVING A HIGHLY SMOOTH METAL REFLECTIVE LAYER

(75) Inventor: Pontus Wallentin, Ljungsbro (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/979,866

(22) Filed: Nov. 26, 1997

(51) Int. Cl.$^7$ .................................................. H04Q 7/20
(52) U.S. Cl. ................................. 455/442; 455/524
(58) Field of Search ................................. 455/422, 432, 455/433, 435, 436, 442, 517, 523, 524, 554, 555, 560

(56) References Cited

U.S. PATENT DOCUMENTS

| | | |
|---|---|---|
| 5,101,501 | 3/1992 | Gilhousen et al. . |
| 5,303,289 | 4/1994 | Quinn . |
| 5,483,668 | 1/1996 | Malkamaki et al. . |
| 5,490,136 | 2/1996 | Sereno et al. . |
| 5,521,963 | 5/1996 | Shrader et al. . |
| 5,533,014 | 7/1996 | Willars et al. . |
| 5,566,181 | 10/1996 | Huang et al. . |
| 5,586,119 | 12/1996 | Scribano et al. . |
| 5,586,170 | 12/1996 | Lea . |
| 5,598,459 | 1/1997 | Haartsen . |
| 5,697,054 * | 12/1997 | Andersson ........................... 455/524 |
| 5,722,074 | 2/1998 | Muszynski . |
| 5,850,607 | 12/1998 | Muszynski . |
| 5,881,059 * | 3/1999 | Deschaine et al. .................. 455/524 |

FOREIGN PATENT DOCUMENTS

| | | |
|---|---|---|
| 0 679 042 A2 | 10/1995 | (EP) . |
| WO 95/04420 | 2/1995 | (WO) . |
| 95/08898 | 3/1995 | (WO) . |
| WO 95/08897 | 3/1995 | (WO) . |
| WO 95/15665 | 6/1995 | (WO) . |
| WO 97/23098 | 6/1997 | (WO) . |
| WO 97/41698 | 11/1997 | (WO) . |

OTHER PUBLICATIONS

Cheung, et al, "Network Configurations for Seamless Support of CDMA Soft Handoffs Between Cell–Clusters", Dept. of Electrical Engineering, The University of British Columbia, 0–7803–3300–4/96 ®1996, pp. 295–299.

"Digital Cellular Telecommunications System (Phase 2+); Mobile Applications Part (MAP) Specification (GSM 09.02 version 5.8.0)", European Telecommunications Standard Institute; Draft pr ETS 300 974, Feb. 1998.

Jones, et al., IS–634 revision A (PN–3539) 2nd Ballot Version—Draft V&V, Oct. 27, 1997, pp. 1–4, 10–16 and 18.

Jones, et al., IS–634 revision A—part 3 (IS–643.3 rev A) (PN–3539) 2nd Ballot Version—Draft V&V, Oct. 27, 1997, pp. 56–60 and 70–71.

* cited by examiner

Primary Examiner—Nguyen Vo
Assistant Examiner—Sam Bhattacharya
(74) Attorney, Agent, or Firm—Nixon & Vanderhye, P.C.

(57) ABSTRACT

In a soft handover cellular system, diversity handling operations are multistaged for a mobile connection which is controlled by an original or Source RNC ($122_1$) and which also utilizes a secondary or Target RNC ($122_2$). Non-Source RNCs each have a diversity handling units (DHU) which perform connection splitting and connection combining operations for all involved base stations (BS) owned by the non-Source RNC, so that only one transport connection need exist between the Source RNC and the Target RNC for the mobile connection. The Source RNC ($122_1$) has a diversity handover unit ($130_1$) which not only performs connection splitting and connection combining with respect to the involved base stations owned by the Source RNC, but also with respect to the one transport connection for each Target RNC involved in the mobile connection.

11 Claims, 9 Drawing Sheets

MAGNETORESISTIVE DEVICE HAVING A HIGHLY SMOOTH METAL REFLECTIVE LAYER

This patent application is related to U.S. patent application Ser. No. 08/980,013 filed simultaneously, entitled "Diversity Handling Moveover for CDMA Mobile Telecommunications", which is incorporated herein by reference.

BACKGROUND

Field of the Invention

In mobile telecommunications, a mobile station such as mobile telephone communicates over radio channels with base stations. Typically a plurality of base stations are, in turn, ultimately connected to a mobile switching center. The mobile switching center is usually connected, e.g., via a gateway, to other telecommunication networks, such as the public switched telephone network.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997).

In addition, in CDMA mobile communications, typically the same baseband signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels from multiple base stations by a mobile station in a CDMA scheme is termed "soft handover" or "macro diversity."

FIG. 1 shows a radio access network (RAN) 20 which comprises radio network controllers (RNC) $22_1$ and $22_2$ respectively connected to mobile switching centers (MSC) $24_1$ and $24_2$. Radio network controller (RNC) $22_1$ is connected to base stations (BS) $26_{1,1}$, $26_{1,2}$, and $26_{1,3}$; radio network controller (RNC) $22_2$ is connected to base stations (BS) $26_{2,1}$, $26_{2,2}$, and $26_{2,3}$. At the moment shown in FIG. 1, and for reasons summarized above, mobile station MS is shown in FIG. 1 as having radio communication with two base stations, particularly base stations $26_{1,2}$ and $26_{1,3}$. The lines $28_{1,2}$ and $28_{1,3}$ each represent a communication path. Specifically, line $28_{1,2}$ depicts both the radio channel from mobile station MS to base station BS $26_{1,2}$ and the land line link channel from base station BS $26_{1,2}$ to radio network controller (RNC) $22_1$; line $28_{1,3}$ depicts both the radio channel from mobile station MS to base station BS $26_{1,3}$ and the land line link channel from base station BS $26_{1,2}$ to radio network controller (RNC) $22_1$. In the case of both lines $28_{1,2}$ and $28_{1,3}$, the land line link is connected to a diversity handover unit (DHU) $30_1$ of radio network controller (RNC) $22_1$.

Thus, as depicted with reference to FIG. 1, the mobile connection with mobile station MS potentially utilizes several "legs", each leg being represented by the lines $28_{1,2}$ and $28_{1,3}$ in the case of mobile station MS of FIG. 1. As the overall connection between mobile station MS and any other party is viewed, the diversity handover unit (DHU) $30_1$ serves essentially both to combine and split the different legs utilized by a mobile station. The splitting occurs in the sense that information directed toward the mobile station is directed along the plural parallel legs to differing base stations. Information received from a base station may actually be obtained through several of the legs (e.g., from several base stations), in which sense the diversity handover unit (DHU) $30_1$ serves a combining function.

FIG. 1 illustrates the simple case in which the different legs of the connection, represented by lines $28_{1,2}$ and $28_{1,3}$, are for base stations BS all of which are connected to radio network controller (RNC) $22_1$. However, should the mobile station MS roam sufficiently to pick up signals from another base station, e.g., into or proximate a cell handled by another base station, such as base station BS $26_{2,1}$, for example, a more complex situation occurs as shown in FIG. 1A.

In the situation depicted in FIG. 1A, the mobile connection involving mobile station MS employs base stations belonging to differing radio network controllers (RNC). Such situation involves a different type of handover—an inter-RNC soft handover. Inter-RNC soft-handovers are made between two or several RNCs. In the particular situation shown in FIG. 1A, an inter-RNC soft handover is made between radio network controller (RNC) $22_1$, which is also known as the "Source" RNC, and radio network controllers (RNC) $22_2$, which is also known as the "Target" RNC. Radio network controller (RNC) $22_1$ is the Source RNC since it has current control of the mobile radio connection. The Target RNC is an RNC, other than the Source RNC, that has, or has been decided to have, base stations utilized by the mobile radio connection.

To facilitate, e.g., inter-RNC soft-handovers, the radio network controllers (RNC) $22_1$ and $22_2$ are connected by an inter-RNC transport link 32. Inter-RNC transport link 32 is utilized for the transport of control and data signals between Source RNC $22_1$ and Target RNC $22_2$, and can be either a direct link or a logical link as described, for example, in International Application Number PCT/US94/12419 (International Publication Number WO 95/15665).

Thus, in FIG. 1A, the mobile station MS communicates not only through the leg represented by line $28_{1,3}$, but now also by the leg represented by line $28_{2,1}$. The leg represented by line $28_{2,1}$ includes the radio link between mobile station MS and base station BS $26_{2,1}$, as well as the information pertinent to the mobile connection which is carried over inter-RNC transport link 32.

As mobile station MS continues to move, it may eventually occur that all of the base stations utilized by the mobile station are served by the Target RNC $22_2$, as is pictured in FIG. 1B. In such case, inter-RNC transport link 32 must carry both legs of the mobile connection, represented by lines $28_{2,1}$ and $28_{2,2}$, respectively. Carrying multiple legs of the same mobile connection undesirably demands further resources from inter-RNC transport link 32. In FIG. 1B, diversity handover unit $30_1$ handles all combining and splitting operations, even though no base station owned by Source RNC $22_1$ is employed by the mobile connection with mobile station MS.

For the situation shown in FIG. 1B, resources of inter-RNC transport link 32 can be preserved if the diversity handling operations are moved to Target RNC $22_2$. Utilization of inter-RNC transport link 32 would be reduced in that, for example, multiple packets destined in parallel for base stations BS $26_{1,2}$ and $26_{2,2}$ need not be carried on link 32, but rather a diversity handover unit at Target RNC $22_{2,2}$ could instead perform the splitting. A similar economy results in having a diversity handover unit at Target RNC $22_{2,2}$ combining the signals from mobile station MS as received via the base stations BS $26_{2,1}$ and $26_{2,2}$, and forwarding a resultant signal to Source RNC $22_1$.

The movement of diversity handling operations (diversity handling "moveover") to a Target RNC, such as Target RNC $22_2$ of FIG. 1B, is a complex endeavor, and can potentially result in an interruption of the established mobile connection. The prior art approach to moving diversity handling operations is shown in International Application Number PCT/US94/12419 (International Publication Number WO 95/15665). That approach, illustrated in FIG. 1C, involves a two step process. The first step of the process is routing the mobile connection, in a bypass mode, through a diversity handling unit (DHU) $30_2$ in the Target RNC $22_2$ upon first utilization by mobile station MS of the Target RNC (e.g., when a base station served by Target RNC is first invoked). In its bypass mode, diversity handling unit (DHU) $30_2$ in the Target RNC $22_2$ performs no combining or splitting operations. Rather, all combining and splitting operations remain the province of diversity handling unit (DHU) $30_1$ in Source RNC 22.

Only later, when (and if) all base stations utilized by mobile station are owned by the Target RNC $22_2$, is the second step of the above-described approach implemented. In the second step, the combining and splitting functions are moved from diversity handover unit (DHU) $30_1$ of Source RNC $22_1$ to diversity handover unit (DHU) $30_2$ of Source RNC $22_2$, and diversity handover unit (DHU) $30_1$ is bypassed as shown in FIG. 1C. Thus, the control of the mobile connection is essentially transferred to Target RNC $22_2$ in accordance with Interface Specification "TIA IS-634/PN-3539 MSC-BS Interface".

Thus, until the diversity handling operations (e.g., the connection combining and connection splitting operations) are moved to the Target RNC, the situation may exist (as in FIG. 1B, for example) in which two or more legs of a mobile connection require separate transport connections on the inter-RNC link. That is, frames and signaling from more than one base station owned by a Target RNC and involved in the same mobile connection are transported on the inter-RNC link to the diversity handling unit (DHU) of the Source RNC. Duplication of frames with the same frame number, and hence of same content albeit perhaps different quality, from differing base stations and the signaling associate with those base stations thus increases traffic on the inter-RNC link. Moreover, since diversity handling may never occur, the increased traffic on the inter-RNC link may continue for the duration of the mobile connection.

What is needed therefore, and an object of the invention, is an efficient and economical technique for handling connection combining and connection splitting operations for a multiple-legged mobile connection.

SUMMARY OF THE INVENTION

Diversity handling operations are multistaged for a mobile connection which is controlled by an original or Source RNC and which also utilizes a secondary or Target RNC. Each non-Source RNCs has a diversity handling unit which performs connection splitting and connection combining operations for all involved base stations owned by the non-Source RNC, so that only one transport connection need exist between the Source RNC and the Target RNC for the mobile connection. The Source RNC has a diversity handling unit which not only performs connection splitting and connection combining with respect to the involved base stations owned by the Source RNC, but also with respect to the one transport connection for each Target RNC involved in the mobile connection.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
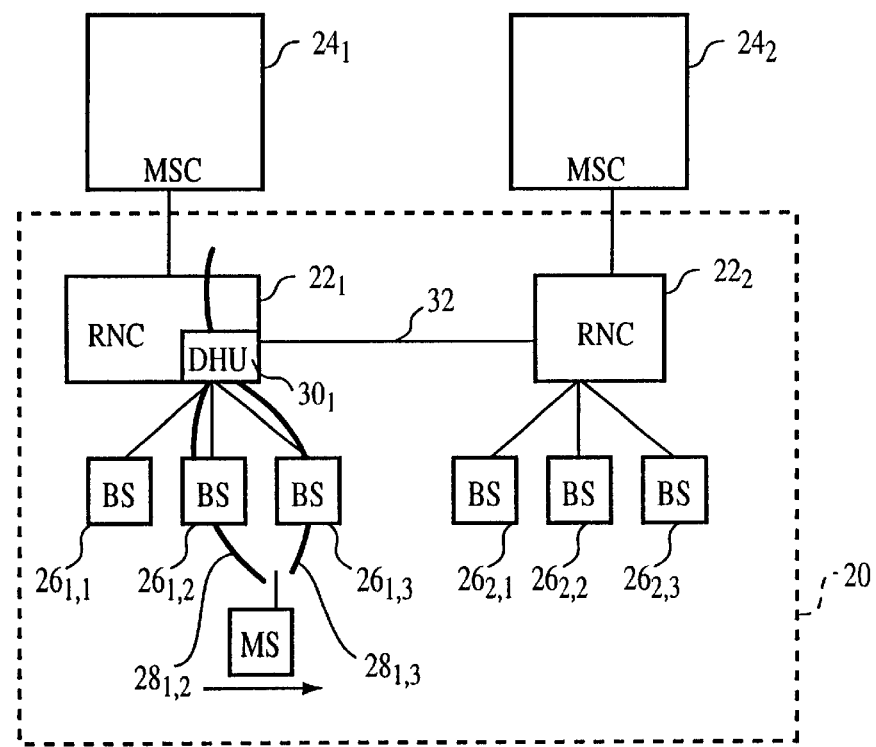
FIG. 1, FIG. 1A, FIG. 1B, and FIG. 1C are each diagrammatic views showing prior art management of a mobile connection for a mobile station moving from base stations owned by a Source radio network controller to base stations controlled by a Target radio network controller.
Figure 1A:
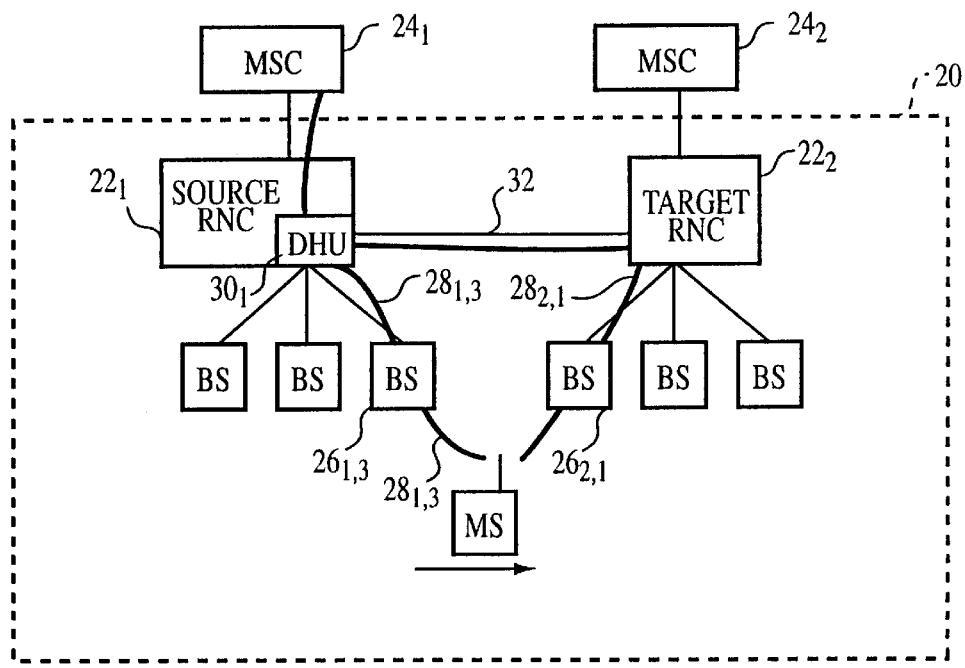
Figure 1C:
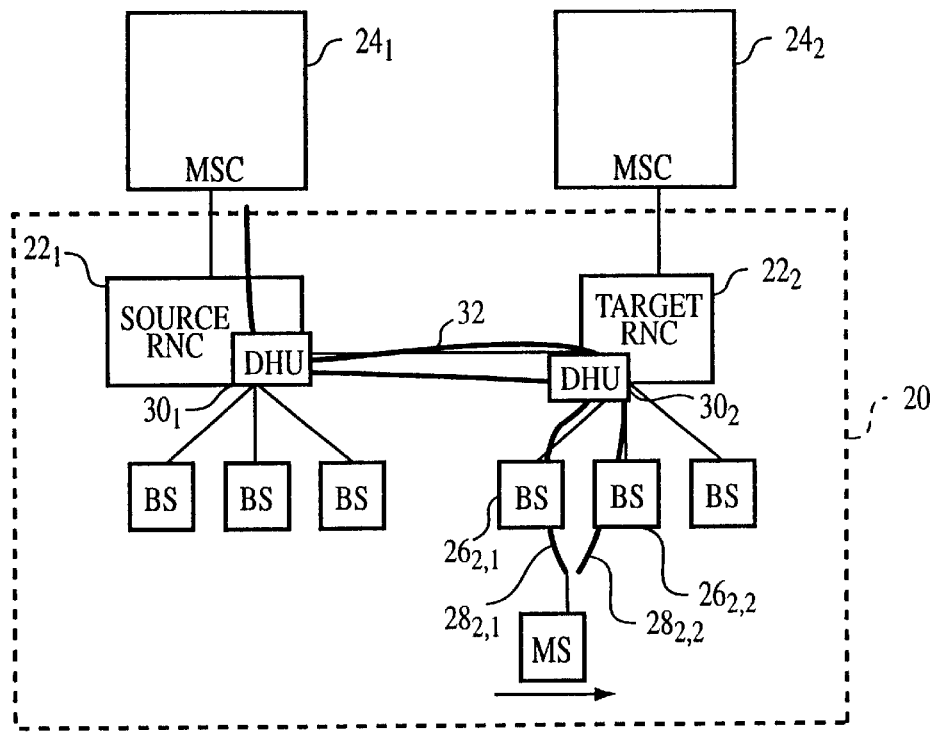
Figure 1B:
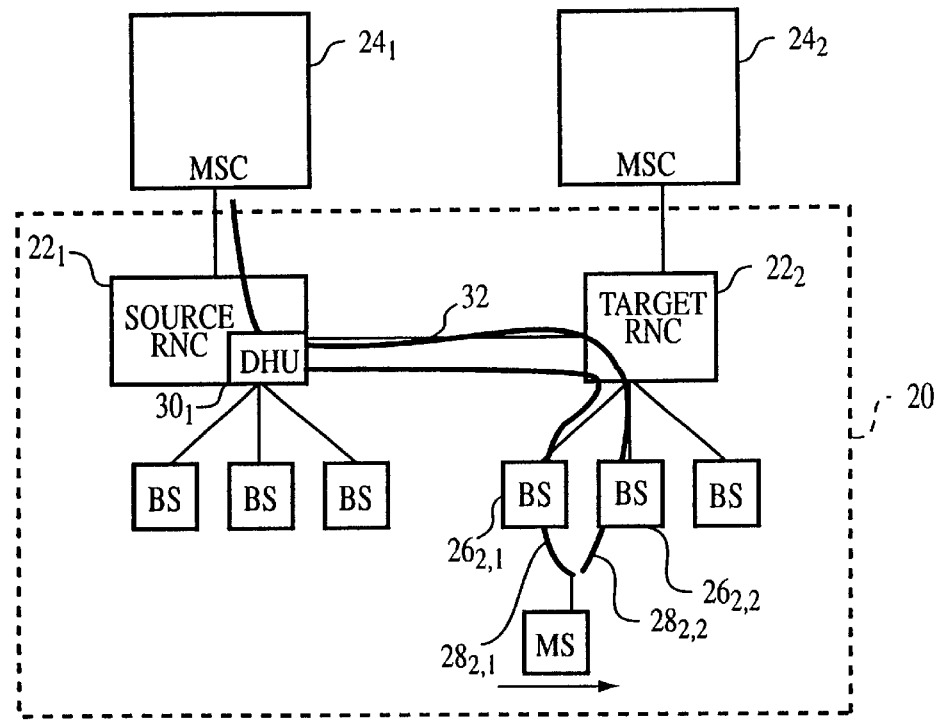
Figure 2:
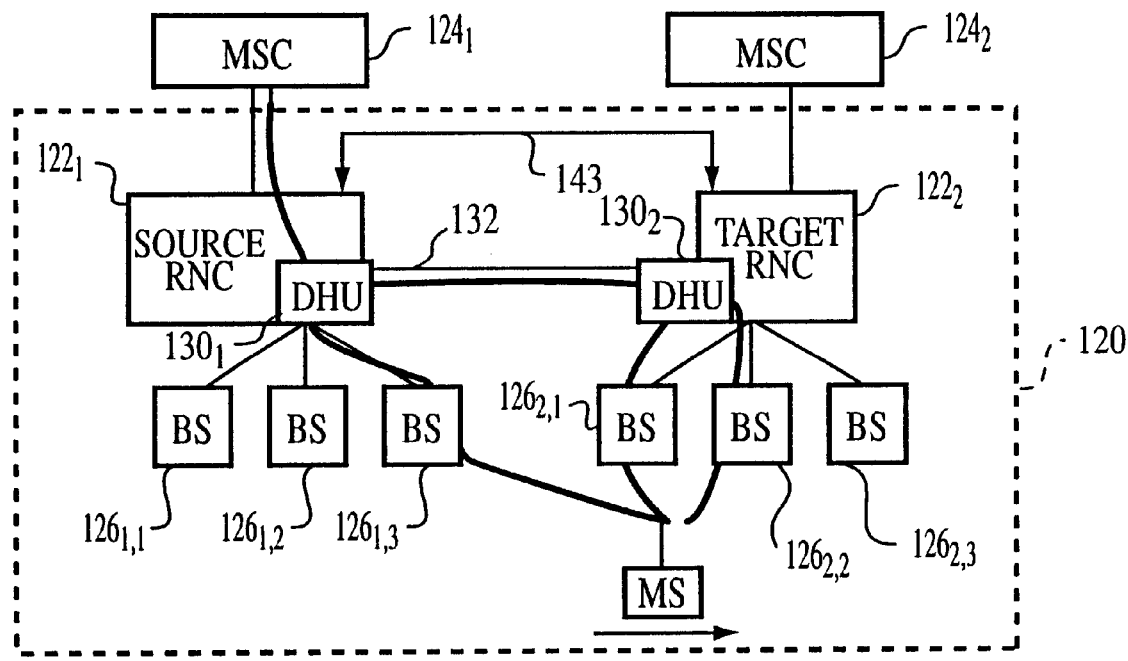
FIG. 2 is a diagrammatic view of radio area network which utilizes multistage diversity handling according to a mode of the invention.

FIG. 2 shows a radio network area 120 of the present invention which comprises a first set of base stations (BS) $126_{1,1}$, $126_{1,2}$, and $126_{1,3}$ connected by land lines to Source radio network controller (RNC) $122_1$, and a second set of base stations (BS) $126_{1,2}$, $126_{2,2}$, and $126_{2,3}$ connected by land lines to a second radio network controller (RNC) $122_2$ which serves as a Target radio network controller. Source RNC $122_1$ is connected to mobile switching center $124_1$ while Target RNC $122_2$ is connected to mobile switching center $124_2$. Source RNC $122_1$ and Target RNC $122_2$ are connected by inter-RNC transport link 132. Inter-RNC transport link 132 can be seen as a logical link, and may be physically switched via other nodes (e.g., other RNCs or MSCs). Source RNC $122_1$ and Target RNC $122_2$ are considered as control nodes of radio network area 120 in that, among other things, these RNCs control or manage the sets of base stations respectively connected thereto.

As described in more detail herein, for a mobile connection controlled by an original or Source RNC and also utilizing a secondary or Target RNC, diversity handling operations are multistaged. That is, non-Source RNCs have diversity handling units which perform connection splitting and connection combining operations for all involved base stations owned by the non-Source RNC, so that only one transport connection need exist for the mobile connection through the inter-RNC link to the Source RNC. The Source RNC has a diversity handling unit which not only performs connection splitting and connection combining with respect to the involved base stations owned by the Source RNC, but also with respect to the one transport connection for each Target RNC involved in the mobile connection.

As an example, in a downlink scenario involving Source RNC $122_1$ and Target RNC $122_2$ of FIG. 2, for a mobile connection with mobile station MS, Source diversity handover unit (DHU) $130_1$ [also known as a diversity trunk unit] receives frames from mobile switching center $124_1$ and applies the frames to base station $126_{1,3}$ and via inter-RNC link 132 to Target RNC $122_2$. In Target RNC $122_2$, Target diversity handover unit (DHU) $130_2$ obtains the frames and distributes a copy of each frame to each involved base station, i.e., base station (BS) $126_{2,1}$ and base station (BS) $126_{2,2}$.

In the uplink, Target diversity handover unit (DHU) $130_2$ receives parallel frames for the mobile connection involving mobile station MS from both base station (BS) $126_{2,1}$ and base station (BS) $126_{2,2}$, selects the best frame of like-numbered frames, and applies the resultant (best) frame to Source diversity handling unit (DHU) $130_1$ on inter-RNC link 132. At Source diversity handling unit (DHU) $130_1$ the Source diversity handover unit (DHU) $130_1$ choses between the resultant frame forwarded from Target RNC $122_2$ and a similarly numbered frame obtained from its own base station, base station (BS) $126_{1,3}$. In this manner, transport of duplication frames and signaling associated therewith on inter-RNC link 132 is eliminated, since transport need not occur with respect to both of base station (BS) $126_{2,1}$ and base station (BS) $126_{2,2}$.

Figure 3:
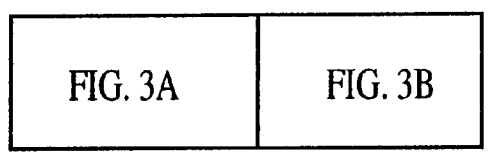
FIG. 3 is a diagrammatic view showing a relationship of FIG. 3A and FIG. 3B.
Figure 3A:
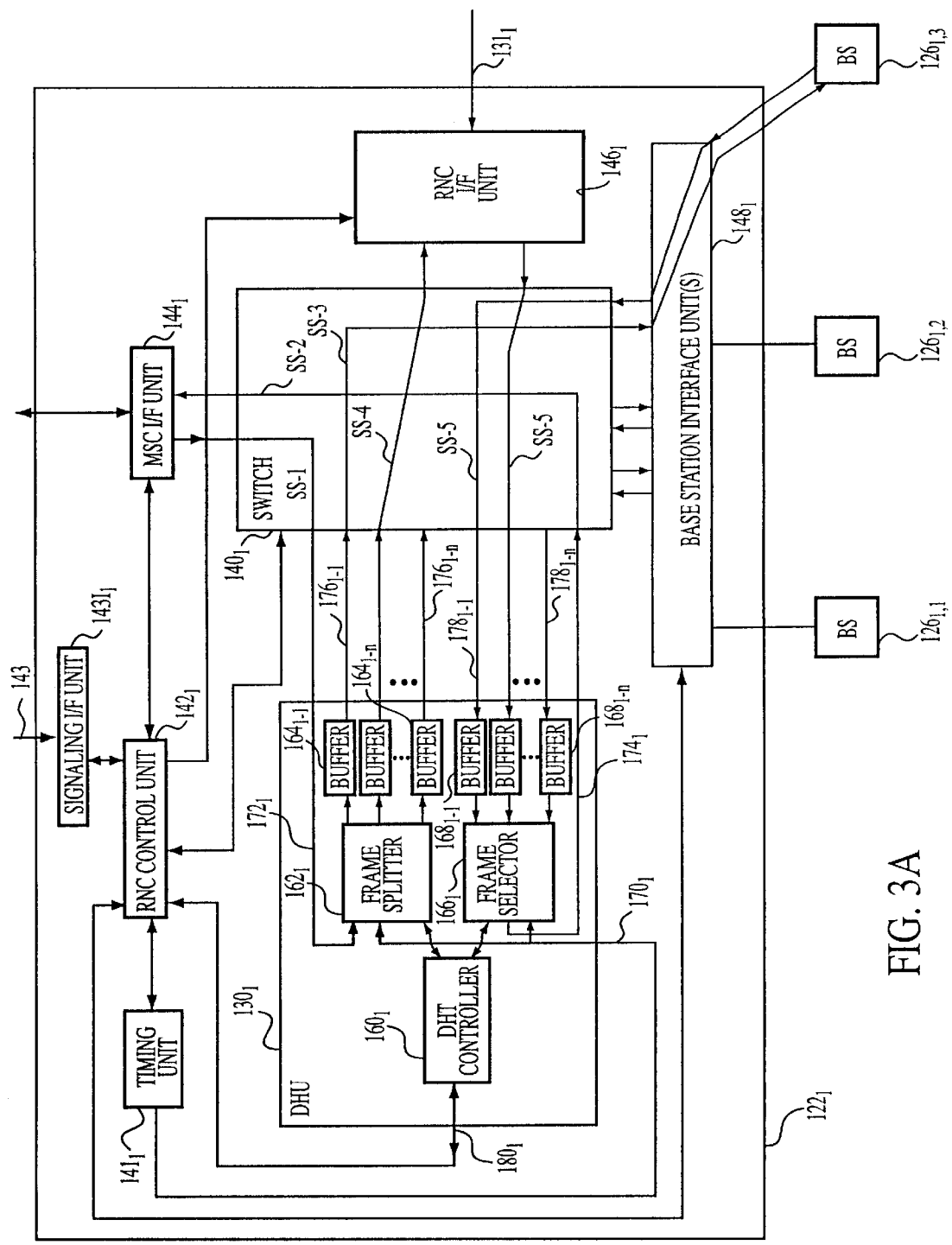
FIG. 3A is a schematic view showing a Target RNC and base stations managed thereby included in the radio area network of FIG. 2.

Source RNC $122_1$ is shown in more detail in FIG. 3A as comprising a switch $140_1$. Switch $140_1$, which is controlled by RNC control unit $142_1$, has a plurality of ports, some of which are connected to diversity handover unit (DHU) $130_1$ and others of which are connected to various interfaces. Diversity handover unit (DHU) $130_1$ is connected to a timing unit $141_1$. The RNC control unit $142_1$ is connected to each element of RNC $122_1$.

For reasons explained hereinafter, Source RNC $122_1$ is connected to a signaling network represented by line 143. Source RNC $122_1$ is connected to signaling network 143 via a signaling interface $143I_1$. Signaling interface $143I_1$ is connected to RNC control unit $142_1$.

The interfaces connected to ports of switch $140_1$ include MSC interface unit $144_1$; RNC interface unit $146_1$; and base station interface unit $148_1$. MSC interface unit $144_1$ is connected to mobile switching center $124_1$. RNC interface unit $146_1$ is connected to inter-RNC transport link 132. Base station interface unit $148_1$ is connected to the first set of base stations (BS) served by Source RNC $122_1$.

Diversity handover unit (DHU) $130_1$ of Source RNC $122_1$ primarily comprises DHU controller $160_1$; frame splitter $162_1$; a set of downlink buffers $164_{1-1}$–$164_{1-n}$; a frame selector $166_1$; and a set of uplink buffers $168_{1-1}$–$168_{1-n}$. Both frame splitter $162_1$ and frame selector $166_1$ receive timing signals on line $170_1$ from timing unit $141_1$, and are also connected to DHU controller $160_1$.

Frame splitter $162_1$ receives (via switch $140_1$) frames on line $172_1$ from mobile switching center $124_1$, while frame selector sends frames on line 1741 to mobile switching center $124_1$. Lines $172_1$ and 1741 are connected to particular ports of switch $140_1$ which are internally connectable through switch $140_1$ to mobile switching center $124_1$.

Frame splitter $162_1$ outputs frames received from mobile switching center $124_1$ on line $172_1$ to each of one of the buffers in set 164 which correspond to a base station currently involved in the mobile connection for the mobile station. Each of the buffers in set 164 is in turn connected to transmit the frames it receives to switch $140_1$ over lines $176_{1-1}$–$176_{1-n}$. Lines $176_{1-1}$–$176_{1-n}$ are connected to respective input ports of switch $140_1$, which input ports are internally cross connectable (e.g., switchable) through switch $140_1$ to the downlink land lines for the respective base stations BS participating in the mobile connection.

Frame selector $166_1$ receives frames from various ones of the buffers in the set of up-link buffers $168_1$–$168_n$. Base stations (BS) participating in a mobile connection send frames to their corresponding uplink buffers $168_1$–$168_n$ on corresponding ones of lines $178_1$–$178_n$. Each of lines $178_1$–$178_{1-n}$ is connected to corresponding ports of switch $140_1$, with those ports being internally switchable internally through switch $140_1$ to up-link land lines from the corresponding base stations (BS). Thus, when plural base stations are involved in a mobile connection, for plural frames representing the same up-linked information (e.g., frames having the same frame number) frame selector $166_1$ picks the best frames for transmission (via switch $140_1$) to mobile switching center $124_1$.

As indicated above, DHU controller $160_1$ of diversity handover unit (DHU) $130_1$ is connected to frame splitter $162_1$ and frame selector $166_1$, for controlling operations thereof, as well as by line $180_1$ to RNC control unit $142_1$. RNC control unit $142_1$ supervises operation of DHU controller $160_1$ and coordinates operations of DHU controller $160_1$ with other elements of Source RNC $122_1$.

Figure 3B:
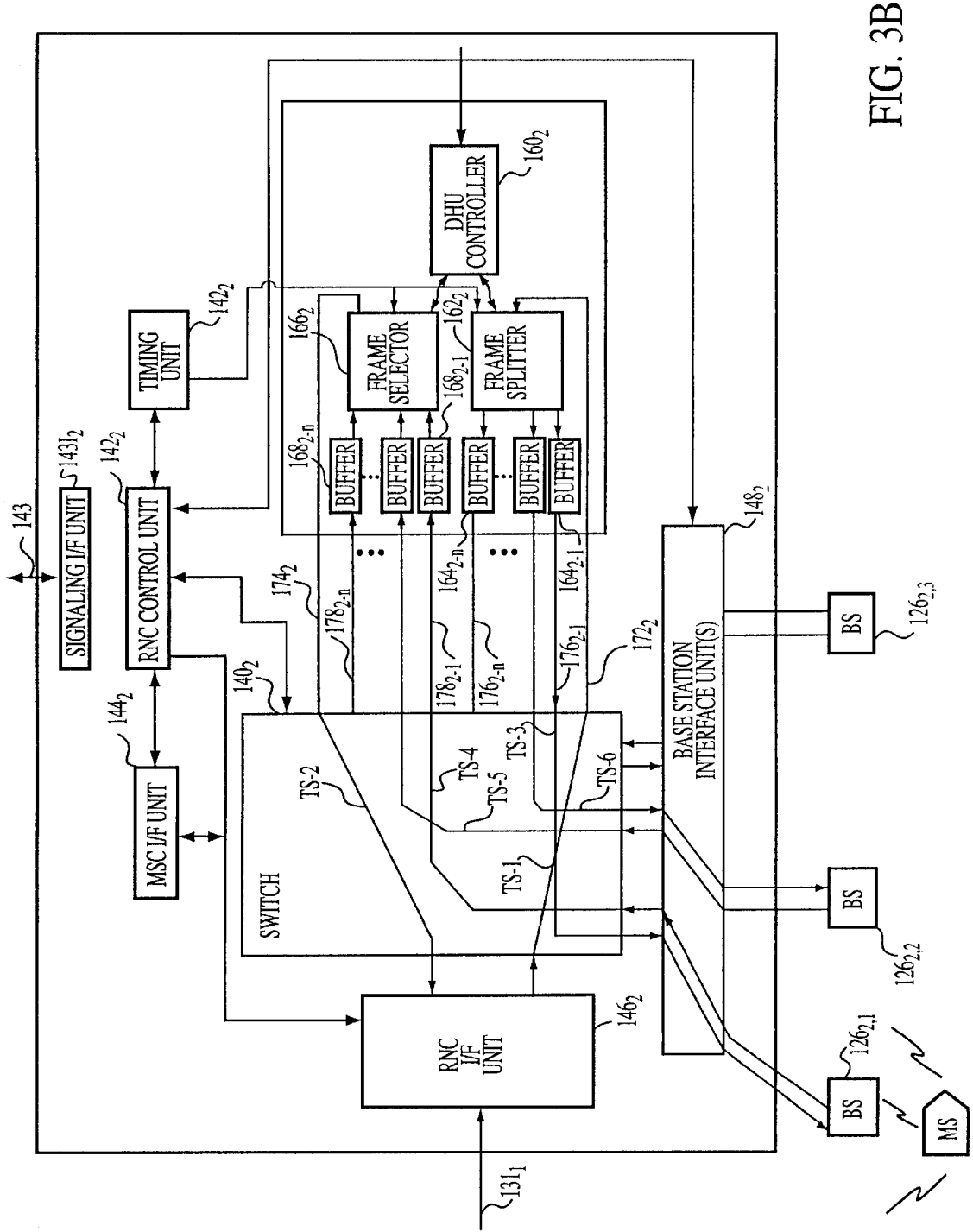
FIG. 3B is a schematic view showing a Source RNC and base stations managed thereby included in the radio area network of FIG. 2.

FIG. 3B shows Target RNC $122_2$ inclusive of Target diversity handover unit (DHU) $130_2$. Target RNC $122_2$ of FIG. 3B has essentially the same structure as Source diversity handling unit (DHU) $130_1$ of FIG. 3A, and likewise Target diversity handover unit (DHU) $130_2$ of FIG. 3B has essentially the same structure as Source diversity handover unit (DHU) $130_1$ of FIG. 3A. Therefore, the preceding discussion of FIG. 3A suffices for explanation of the elements and connections of Target RNC $122_2$ and its Target diversity handover unit (DHU) $130_2$, it being understood that elements of Target RNC $122_2$ and Target diversity handover unit (DHU) $130_2$ are similarly numerically referenced in FIG. 3B as in FIG. 3A but with differing subscripts (a subscript of "2" referring to Target RNC $122_2$ and a subscript of "1" referring to Source diversity handling unit (DHU) $130_1$).

Figure 4:
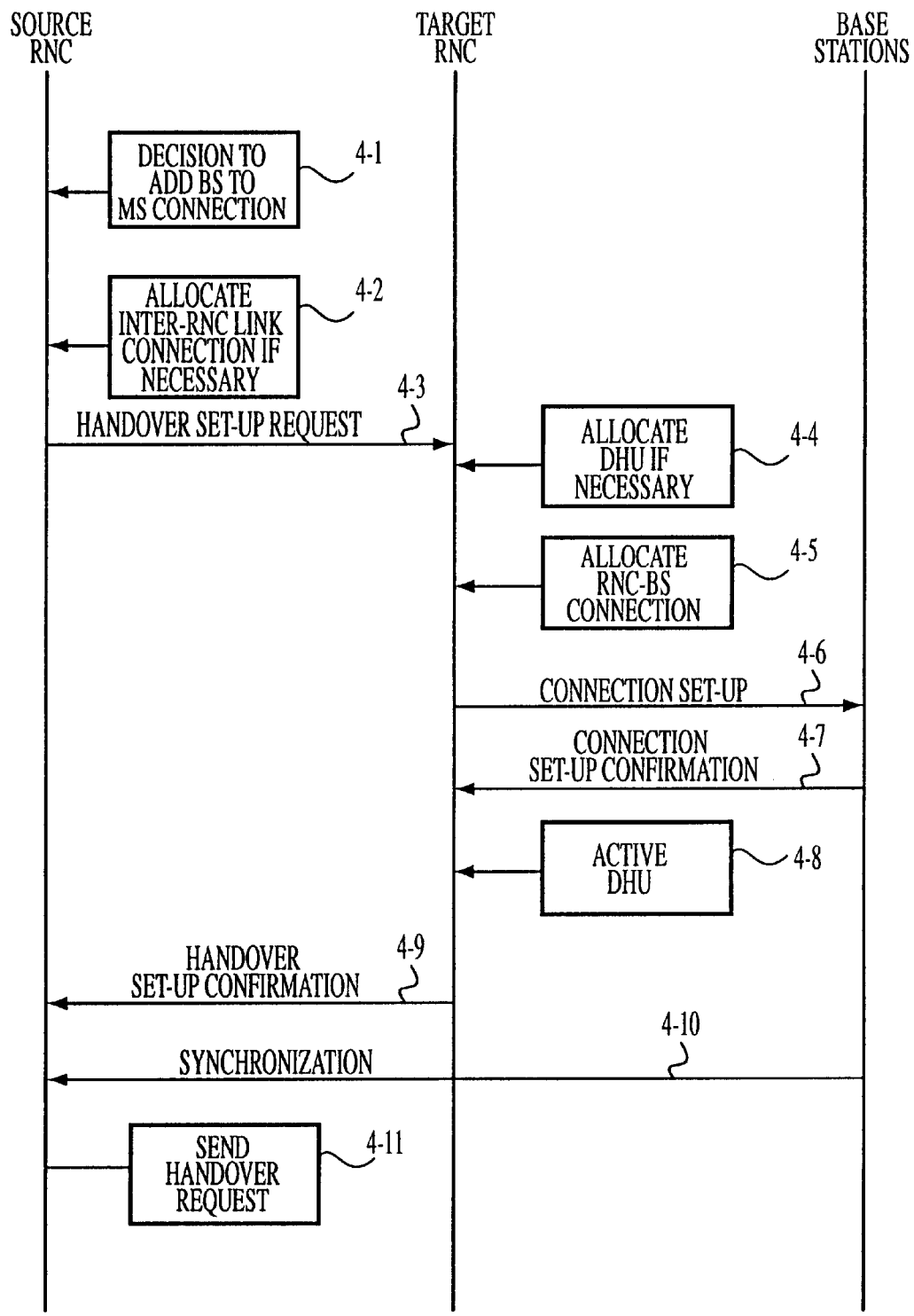
FIG. 4 is a schematic view of a sequence of operations according to an mode of the invention.

FIG. 4 shows a sequence of operations according to an embodiment of the invention. FIG. 4 shows in three separate parallel vertical lines the operations conducted by each of Source RNC $122_1$, Target RNC $122_2$, and the base stations (BS) served by Target RNC $122_2$ and involved in the mobile communication with mobile station MS.

Operation 4-1 of FIG. 4 shows RNC control unit $142_1$ of Source RNC $122_1$ determining that a new base station not owned by Source RNC $122_1$ should be added to the mobile connection for mobile station MS. It will be assumed, in connection with an example illustrative scenario now described, that the mobile connection for mobile station MS thus far involves only base station (BS) $126_{1,3}$ and base station (BS) $126_{2,1}$. That is, the point in time for operation 4-1 for the illustrative example precedes the moment in time shown in FIG. 2, FIG. 3A, and FIG. 3A (e.g., that base station (BS) $126_{2,2}$ has not yet been added to the connection for mobile station MS. In fact, the determination made at operation 4-1 is that base station (BS) $126_{2,2}$ now needs to be added to the mobile connection for mobile station MS.

Reflecting the illustrative scenario, FIG. 3A shows Target diversity handover unit (DHU) $130_2$ of Source RNC $122_1$ handling legs of the mobile connection for mobile station MS with both base station (BS) $126_{1,3}$ and base station (BS) $126_{2,1}$. Line SS-1 of FIG. 3A shows that switch $140_1$ is internally cross connected to send frames from MSC I/F unit $144_1$ to frame splitter $162_1$, from whence copies of the frames are forwarded to base station (BS) $126_{1,3}$ (as depicted by switch cross connection line SS-3) and to base station (BS) $126_{2,1}$ (as depicted by switch cross connection line SS-4 in switch $140_1$ and cross connection lines TS-1 and TS-3 in switch $140_2$ [see FIG. 3B]). The frame selector 1661 of Source diversity handover unit (DHU) $130_1$ receives frames from base station (BS) $126_{3,1}$ and base station (BS) $126_{2,1}$. Frames from base station (BS) $126_{3,1}$ are applied to frame selector 1661 via cross connection line SS-5 and from base station (BS) $126_{2,1}$ via cross connection line SS-6 of switch $140_1$ and cross connection lines TS-4 and TS-2 of switch $140_2$ [see FIG. 3B]. Frame selector 1661 of Source diversity handover unit (DHU) $130_1$ selects the best of similarly numbered frames from the two legs of the connection, and applies the best frames to mobile switching center $124_1$ via cross connection line SS-2 and MSC I/F unit $144_1$ [see FIG. 3A].

Returning to operation 4-1, the determination to add base station (BS) $126_{2,2}$ to the mobile connection for mobile station MS is made by RNC control unit $141_1$ of Source RNC $122_1$. The determination is based on measurements obtained by mobile station MS and transmitted to Source RNC $122_1$.

Once the determination to add a new base station BS not owned by another RNC is made at operation 4-1, Source RNC $122_1$ checks whether any base station owned by that other RNC is already in use by the mobile connection for mobile station MS. If the mobile connection for mobile station MS does not thus far utilize a base station owned by that other RNC, Source RNC $122_1$ allocates a connection on inter-RNC link 132, as depicted by operation 4-2. RNC control unit $142_1$ allocates a port of switch $140_1$ and a port of RNC interface unit $146_1$ to be used by the new connection on inter-RNC link 132 between Target RNC $122_2$ and Source RNC $122_1$. Further, Source RNC $122_1$ then requests its Source diversity handover unit (DHU) $130_1$ to listen for any frames from mobile station MS on inter-RNC link 132 and to send frames destined to mobile station MS on inter-RNC link 132 as well as to involved base stations owned by Source RNC $122_1$.

In the illustrative scenario currently described, a connection on inter-RNC link 132 was previously allocated upon addition of base station (BS) $126_{2,1}$, so that operation 4-2 need not be performed in the illustrative scenario.

After the determination has been made to add a new base station now owned by Source RNC $122_1$, and regardless of whether the added base station is the first base station involved for another RNC, at operation 4-3 Source RNC $122_1$ sends a signaling message to Target RNC $122_2$. Signaling messages between RNCs are transmitted over signaling network 143, and can be in accordance with signaling system no. 7, for example. The signaling message sent at operation 4-3 includes a handover setup request. The handover setup request of operation 4-3 instructs Target RNC $122_2$ to connect to the base station to be added (e.g., in the illustrative scenario, base station (BS) $126_{2,2}$). If the added base station is the first base station owned by Target RNC $122_2$ involved in the connection, the handover setup request also includes an identifier for the inter-RNC connection to be used and a connection identifier respecting the mobile station MS. In the case that Target RNC $122_2$ is already handling a leg of the connection with mobile station MS, the handover setup request includes the identities of the base stations previously allocated by diversity handling unit (DHU) $140_1$ of Source RNC $122_1$ and currently in use for the mobile connection with mobile station MS.

In response to the handover setup request message, at operation 4-4 Target RNC $122_2$ allocates a Target diversity handover unit (DHU) to the mobile connection for mobile station MS in the event that a Target diversity handover unit (DHU) has not yet been allocated for this mobile connection. In the illustrated scenario, Target diversity handover unit (DHU) $130_2$ has already allocated by virtue of previous inclusion of base station (BS) $126_{2,1}$ in the mobile connection for mobile station MS. Had a Target diversity handover unit (DHU) not yet been allocated, the allocation would be accomplished e.g., by connecting, via switch $140_2$, handover unit (DHU) $130_2$ to RNC interface unit $146_2$. Such connections, previously made in the illustrative scenario, are shown by lines TS-1 and TS-2 in FIG. 3B.

In response to the handover setup request message, at operation 4-5 Target RNC $122_2$ allocates a connection to the new base station (i.e., base station (BS) $126_{1,2}$) for mobile station MS. Such connections are shown by cross connection lines TS-5 and Ts-6 in FIG. 3B.

After allocation of a connection to base station (BS) $126_{2,2}$, at operation 4-6 Target RNC $122_2$ sends a connection setup request message to base station (BS) $126_{2,2}$ over semipermanent connections established at start-up of the base station. The connection setup request instructs base station (BS) $126_{2,2}$ to activate the transceiver of base station (BS) $126_{2,2}$ and to connected the transceiver to the indicated RNC-BS connection. When the newly added base station (e.g., base station (BS) $126_{2,2}$) provides a connection setup confirmation message (indicated by operation 4-7), Target RNC $122_2$ activates Target diversity handover unit (DHU) $130_2$ so that Target diversity handover unit (DHU) $130_2$ begins actually to process frames (operation 4-8).

Upon activation of Target diversity handover unit (DHU) $130_2$, Target RNC $122_2$ sends a signaling message to Source RNC $122_1$ with a handover setup confirmation message (operation 4-9). Meanwhile, Source RNC $122_1$ and Target RNC $122_2$ adjust their timing to compensate for any delay differences between (1) the connection involving Source RNC $122_1$ and base station (BS) $126_{1,3}$, and (2) the connection involving Source RNC $122_1$ and Target RNC $122_2$. Such timing adjustment is shown as synchronization operation 4-10 in FIG. 4. Synchronization is particularly important when an added base station is the first base station added for a non-Source RNC for the connection to mobile station MS. Included in operation 4-10 is the newly added base station (e.g., base station (BS) $126_{2,2}$) instructing Target diversity handover unit (DHU) $130_2$ to adjust its sending time if frames arrive too early or too late, and in turn Target diversity handover unit (DHU) $130_2$ instructs Source diversity handover unit (DHU) $130_1$ to adjust its sending time. During operation 4-10 frames may be lost if Source diversity handover unit (DHU) $130_1$ does not have sufficient delay margins. A buffer in Source diversity handover unit (DHU) $130_1$ for providing sufficient delay margin is therefore preferred at original setup of the mobile connection with mobile station MS. Also included in operation 4-10 is a signaling message from Source RNC $122_1$ to Target RNC $122_2$ confirming that synchronization and timing have been adjusted.

When synchronization and timing have been adjusted, at operation 4-11 Source RNC $122_1$ sends a signaling message with a handover request to mobile station MS. The handover request orders the mobile station MS to use, in addition to existing base stations, the newly added base station (e.g., base station (BS) $126_{2,2}$).

Figure 5:
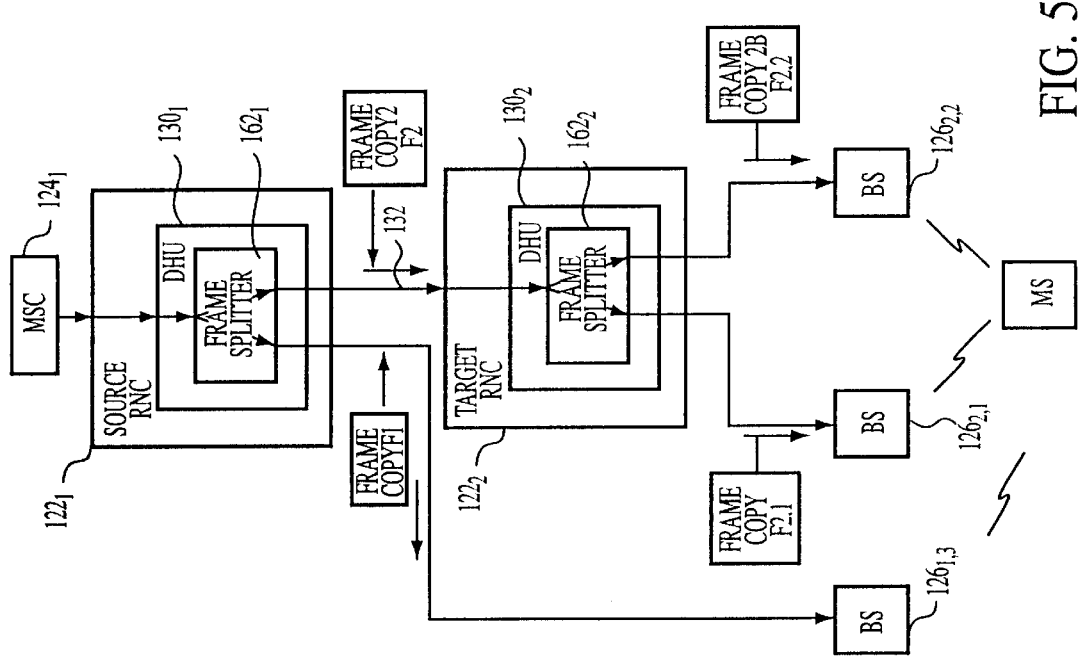
FIG. 5 is a diagrammatic view of a multistage frame splitting operation according to a mode of the invention.

FIG. 5 depicts, in simplified form, a multistage frame splitting operation performed using Source RNC $122_1$ and Target RNC $122_2$ according to a mode of the invention. Frame splitter $162_1$ of Source RNC $122_1$ receives a user traffic frame from mobile switching center $124_1$ which is to be forwarded to mobile station MS. As shown in more detail in FIG. 3A, Frame splitter $162_1$ copies the user traffic frame to downlink buffers $164_{1-1}$ and $164_{1-2}$. Frame splitter $162_1$ applies a frame number to the two frames (the same frame number to both frames). In this regard, timing unit $142_1$ supplies Target diversity handover unit (DHU) $130_2$ with a frame number clock reference.

The two frame copies (frame copy 1 and frame copy 2) are forwarded from downlink buffers $164_{1-1}$ and $164_{1-2}$ both to base station (BS) $126_{3,1}$ and Target RNC $122_2$. The two frame copies are sent from downlink buffers $164_{1-1}$ and $164_{1-2}$ according to timing information contained in synchronization adjustment frames received from the other end [see FIG. 8C]. The first frame copy F1 is forwarded to base station (BS) $126_{3,1}$ using cross connection line SS-3 of switch $140_1$; the second frame copy F2 is forwarded to Target RNC $122_2$ using cross connection line SS-4 of switch $140_1$. FIG. 5 shows the first frame being applied to base station (BS) $126_{3,1}$ and the second frame copy F2 being applied on intra-RNC link 132 to Target RNC $122_2$.

The second frame copy F2 forwarded to Target RNC $122_2$ is routed through switch $140_2$ as indicated by connection line Ts-1 [see FIG. 3B]. The second frame copy F2 is applied to frame splitter $162_2$. Frame splitter $162_2$ makes a copy of the second frame for each of downlink buffers $164_{2-1}$ and $164_{2-2}$, with the respective copies (frame copy F2,1 and frame copy F2,2) being sent to base station (BS) $126_{2,1}$ and base station (BS) $126_{2,2}$, respectively. In customary form, frames from each of the three involved base stations are sent to mobile station MS, with mobile station MS selecting the best of same-numbered frames.

Figure 6:
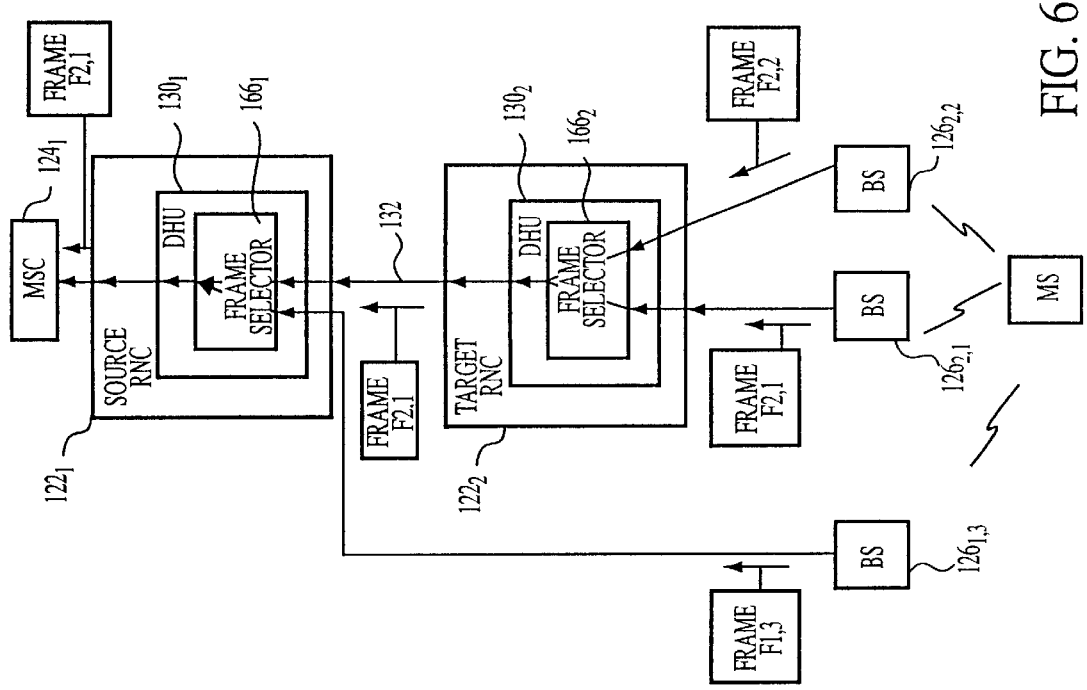
FIG. 6 is a diagrammatic view of a multistage frame combining operation according to a mode of the invention.

FIG. 6 shows, again in simplified form, a multistage frame combining operation performed using Source RNC $122_1$ and Target RNC $122_2$ according to a mode of the invention. In FIG. 6, mobile station MS sends the same frame to each involved base station, e.g., base station (BS) $126_{1,3}$; base station (BS) $126_{2,1}$, and base station (BS) $126_{2,2}$. In FIG. 6, the frame F2,1 received at base station (BS) $126_{2,1}$ is connected through switch $140_2$ (see connection line TS-4 in FIG. 3B) to uplink buffer $168_{2-1}$. Similarly, the frame F2,2 received at base station (BS) $126_{2,2}$ is connected through switch $140_2$ (see connection line TS-5 in FIG. 3B) to uplink buffer $168_{2-2}$. The frame F1 received at base station (BS) $126_{1,3}$ is connected through switch $140_1$ (see connection line SS-5 in FIG. 3A) to uplink buffer $168_{1-1}$.

Using a quality indicator in two copies of the same-numbered frames (frame F2,1 and frame F2,2), frame selector $166_2$ determines the "best" of the two frame copies. More specifically, upon obtaining a frame with a new frame number, Target diversity handover unit (DHU) $130_2$ stores the first frame with the new frame number in the appropriate one of the uplink buffers 168 and awaits, for a specified time interval, arrival of other frames with the same frame number. Upon completion of the specified time interval, frame selector $166_2$ selects the best frame. Any later arriving frames of the same frame number are discarded. Accordingly, FIG. 6 shows Target diversity handover unit (DHU) $130_2$ of Target RNC $122_2$ forwarding one resultant frame (in this illustration, frame F2,1) on inter-RNC link 132 to Source RNC $122_1$.

Frame F2,1 applied on inter-RNC link 132 to Source RNC $122_1$ is routed through switch $140_1$ on connection line SS-5 as shown in FIG. 3A to uplink buffer $168_{1-1}$. The resultant frame obtained from Target diversity handover unit (DHU) $130_2$ of Target RNC $122_2$ is routed through switch $140_1$ (see connection SS-6 in FIG. 3A) and is stored in uplink buffer $168_{1-2}$. With frame selector $166_1$ having both frame F1,3 and frame F2,1 in its set of uplink buffers 168, frame selector 1661 makes a determination of "best" frame in much the same manner as did frame selector 1662 of Target RNC $122_2$. Frame selector $166_1$ forwards the user traffic part of the "best" frame (e.g., frame F2,1 in the example of FIG. 6) to MSC $124_1$. The user traffic part of the "best" frame is routed through switch $140_1$ on connection line SS-2 as shown in FIG. 3A.

Thus, the both frame splitting and frame combining operations of the present invention are multistaged. In particular, in the situation shown in FIG. 2, FIG. 3A, FIG. 3B, FIG. 5, and FIG. 6, for example, Source diversity handover unit (DHU) $130_1$ of Source RNC $122_1$ performs a first stage of frame splitting while Target diversity handover unit (DHU) $130_2$ of Target RNC $122_2$ performs a second stage of frame splitting. Conversely, for frame directed from mobile station MS to MSC $124_1$, Target diversity handover unit (DHU) $130_2$ performs a second stage of frame combining and Source diversity handover unit (DHU) $130_1$ of Source RNC $122_1$ performs a first stage of frame combining.

In the frame combining and frame splitting operation, each the DHU controller of each diversity handover unit (DHU) is supervised by the RNC control unit of the respective RNC node. For example, the RNC control unit instructs its corresponding DHU controller as to which ports of its corresponding switch the diversity handover unit (DHU) shall be connected for reception and transmission of information streams (e.g., frames).

Figure 8:
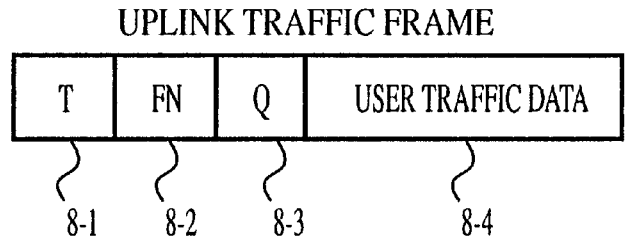
FIG. 8, FIG. 8A, FIG. 8B, and FIG. 8C are diagrammatic view of frames according to an embodiment of the invention.
Figure 8A:
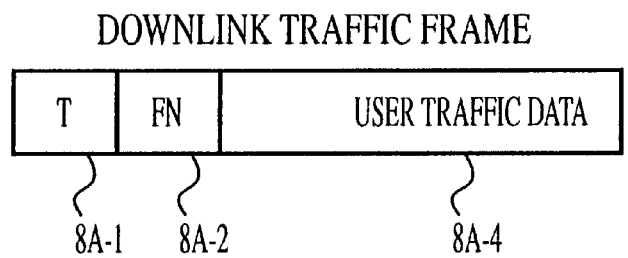

In the foregoing reference has been made to various types of frames, including user traffic frames and synchronization frames. FIG. 8, FIG. 8A, FIG. 8B, and FIG. 8C are diagrammatic view of types of frames utilized according to an embodiment of the invention. Examples of traffic frame formats are shown in FIG. 8 and FIG. 8A. FIG. 8 particularly shows an uplink traffic frame which has a frame type field 8-1; a frame number field 8-2; a quality indicator field 8-3; and, a user traffic data field 8-4. FIG. 8A shows a downlink traffic frame which has a frame type field 8A-1; a frame number field 8A-2; and, a user traffic data field 8A-4.

An example of contents of the quality indicator fields 8-3 and 8-4 is a received signal-to-noise ratio (SIR) for the frame. In addition, a checksum result for the frame could be included in the quality indicator fields 8-3 and 8-4. The quality indicator is used by the frame selector in the diversity handover unit (DHU) to select and forward (to the appropriate mobile switching center MSC) the user traffic data of the best frame, of all of the frames received with a given frame number from all base stations involved for the connection with mobile station MS. The frame splitter, on the other hand, copies the user traffic data to all base stations involved in the connection for mobile station MS, and attaches the frame number for field 8A-2 [see FIG. 8A]. The timing unit (e.g., timing unit supplies the diversity handover unit (DHU) with a frame number and with a frame is number clock reference.

Figure 8B:
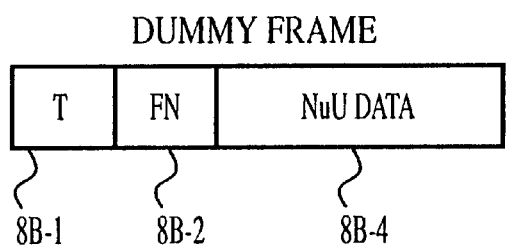

A dummy frame, an example of which is illustrated in FIG. 8B, can be used for establishment of communication and synchronization when no real traffic is to be sent. The example dummy frame of FIG. 8B includes a frame type field 8B-1 and a dummy data field 8B-4.

Figure 8C:
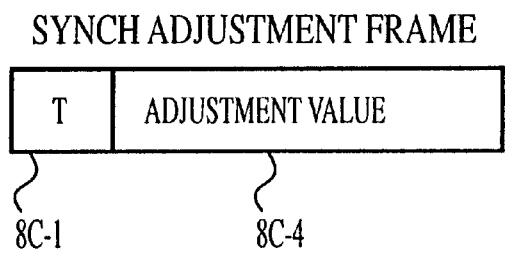

A synchronization frame, such as that shown in FIG. 8C, is employed to carry synchronization adjustment values. The example of the synchronization frame shown in FIG. 8C includes a frame type field 8C-1 and an adjustment value data field 8C-4. In one mode of the invention, the adjustment value data field 8C-4 contains a positive or negative time offset value.

Figure 7:
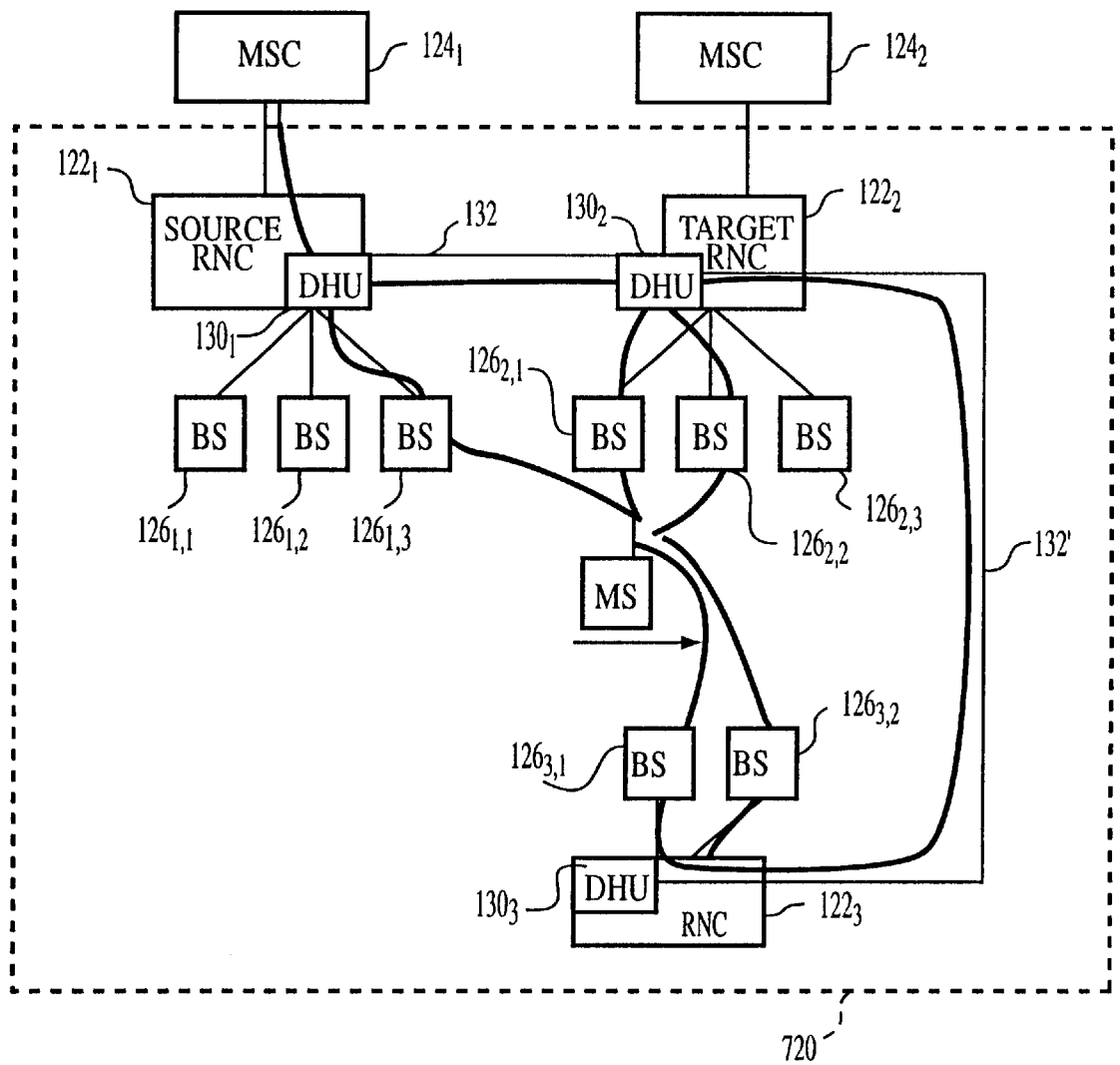
FIG. 7 is a diagrammatic view of radio area network which utilizes multistage diversity handling according to a mode of the invention involving more than two stages.

FIG. 7 shows a radio area network 720 which utilizes multistage diversity handling involving more than two stages. In particular, in addition to Source RNC 122$_1$ and Target RNC 122$_2$ as above discussed, radio area network 720 includes RNC 122$_3$. In the uplink in FIG. 7, diversity handover unit (DHU) 130$_3$ of RNC 122$_3$ combines frames received from base station (BS) 126$_{3,1}$ and base station (BS) 126$_{3,2}$, both of which are included in respective legs of the mobile connection with mobile station MS. For each same-numbered frame received by diversity handover unit (DHU) 130$_3$, one resultant (e.g., "best") frame is forwarded on inter-RNC link 132' to Target RNC 122$_2$. The resultant frame applied on inter-RNC link 132' is connected through switch 140$_2$ to Target diversity handover unit (DHU) 130$_2$. Target diversity handover unit (DHU) 130$_2$ makes a second stage selection from between the resultant frame after making a selection of a best frame from base station (BS) 126$_{2,1}$ and base station (BS) 126$_{2,2}$, and the frames received from each of base station (BS) 126$_{2,1}$ and base station (BS) 126$_{2,2}$. The resultant frame from the second stage combination performed by Target diversity handover unit (DHU) 130$_2$ is forwarded on inter-RNC link 132 to Source RNC 122$_1$. Target diversity handover unit (DHU) 130$_2$ of Source RNC 122$_1$ then performs a first stage combination by selecting one of the frame received from base station (BS) 126$_{1,3}$ and the second stage resultant frame received on inter-RNC link 132. The first stage resultant frame is then forwarded to MSC 124$_1$.

In the downlink, a frame from MSC 124$_1$ is applied through switch 140$_1$ to Target diversity handover unit (DHU) 130$_2$, which performs a first stage split and sends a frame copy to base station (BS) 126$_{3,1}$ and a frame copy on inter-RNC link 132 to Target RNC 122$_2$. The frame copy sent to Target RNC 122$_2$ is routed through switch 140$_2$ to Target diversity handover unit (DHU) 130$_2$, which performs a second stage split of the frame. In the second stage split, copies of the frame are sent to each of base station (BS) 126$_{2,1}$, base station (BS) 126$_{2,2}$, and RNC 122$_3$ (via inter-RNC link 132'). RNC 122$_3$ performs a third stage split by sending copies of the frame to base station (BS) 126$_{3,1}$ and base station (BS) 126$_{3,2}$. Thus, in the FIG. 7 illustration, mobile station MS receives five copies of the same frame, and selects the best frame for utilization.

In view of the foregoing, it should be understood that numerous differently stagged configurations are within the purview of the present invention, including greater number of stages and stages being treed in differing configurations. For example, RNC 122$_3$ of FIG. 7 could be connected by an inter-RNC link to Source RNC 122$_1$ instead of Target RNC 122$_2$, in which case a two stage configuration would exist with Source diversity handover unit (DHU) 130$_1$ applying copies to three members of the second stage (e.g., base station (BS) 126$_{1,3}$, Target RNC 122$_2$, and RNC 122$_3$.

In connection with the foregoing, one mobile connection, specifically the mobile connection for mobile station MS has been discussed. Connections for other mobile stations are likely being handled by each of the RNCs, which typically involves use of the same or other diversity handover units (DHUs) within those RNCs.

In the embodiments described herein, for sake of simplicity only a limited number of base stations (BS) have been shown as connected to each RNC. It should be understood that differing and greater numbers of base stations can be connected to each RNC, and accordingly that the number of downlink and uplink buffers in each diversity handover unit (DHU) is dependent thereon.

In the foregoing discussion, MSC I/F unit 144 and RNC I/F unit 146 have been illustrated as separate interfaces. It should be understood, however, that these interfaces can be combined into a single transport network interface unit.

In the embodiments herein illustrated, the connection between Source diversity handling unit (DHU) 130$_1$ and Target diversity handover unit (DHU) 130$_2$ has been shown as a direct link. It should also be understood that the connection between Source diversity handling unit (DHU) 130$_1$ and Target diversity handover unit (DHU) 130$_2$ can instead be switched via any intermediate node. For example, in an embodiment in which such connection is switched, the intermediate node can be an MSC, an RNC, or a node in the public switched telephone network (PSTN).

It should be noted that the Source DHT (e.g., the DHT that does the second stage of the combining/splitting) can be moved. An example of a preferred embodiment of DHT moveover is described in U.S. patent application Ser. No. 08/980,013 filed simultaneously, entitled "Diversity Handling Moveover for CDMA Mobile Telecommunications", which is incorporated herein by reference.

Advantageously, in accordance with the present invention each inter-RNC link requires only one transport connection for a non-source RNC. This is because the upstage or Source diversity handover unit (DHU) sends only one copy to a Target RNC 122$_2$, with the Target diversity handover unit (DHU) 130$_2$ of the Target RNC 122$_2$ performing splitting operations for the base stations which it owns. Conversely, on the uplink, the downstage or Target diversity handover unit (DHU) 130$_2$ sends only one resultant frame on the inter-RNC link to Source RNC 122$_1$, the Target diversity handover unit (DHU) 130$_2$ having performed a combining operation with respect to all base stations owned by Target RNC 122$_2$.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile telecommunications system comprising:
    a first radio network controller (RNC) node connected to a mobile switching center for handling a mobile connection between the mobile switching center and plural base stations involved in the mobile connection, the first radio network controller (RNC) node serving a first set of base stations involved in the connection, the first radio network controller (RNC) node performing one of a first stage connection combining operation and a first stage connection splitting operation with respect to a mobile connection;
    a second radio network controller (RNC) node serving a second set of base stations involved in the connection, the second radio network controller (RNC) node performing one of a second stage connection combining operation and a second stage connection splitting operation with respect to the second set of base stations involved in the mobile connection; and
    an inter-control node link connecting the first radio network controller (RNC) node and the second radio network controller (RNC) node for carrying one of a second stage connection combining result from the second radio network controller (RNC) node to the first radio network controller (RNC) node and a first stage connection splitting result from the first radio network controller (RNC) node to the second radio network controller (RNC) node.

2. The system of claim 1, wherein the second radio network controller (RNC) node combines same-numbered frames from a plurality of base stations of the second set to yield a resultant frame, and wherein the first radio network controller (RNC) node combines the resultant frame with a same-numbered frame from at least one of the base stations of the first set.

3. The system of claim 1, wherein the first radio network controller (RNC) node forwards copies of the frame received from a mobile switching center to at least one of the base stations of the first set and a single copy of the frame to the second radio network controller (RNC) node, and wherein the second radio network controller (RNC) node forwards copies of the frame received from the first radio network controller (RNC) node to a plurality of base stations of the second set.

4. A method of handling a mobile connection in mobile telecommunications system between a mobile switching center and plural base stations involved in the mobile connection via a first radio network controller (RNC) node, the method comprising:
    performing one of a first stage connection combining operation and a first stage connection splitting operation at the first radio network controller (RNC) node, the first radio network controller (RNC) node serving a first set of base stations involved in the connection;
    performing one of a second stage connection combining operation and a second stage connection splitting operation at a second radio network controller (RNC) node, the second radio network controller (RNC) node serving a second set of base stations involved in the connection;
    using an inter-control node link connecting the first radio network controller (RNC) node and the second radio network controller (RNC) node for carrying one of a second stage connection combining result from the second radio network controller (RNC) node to the first radio network controller (RNC) node and a first stage connection splitting result from the first radio network controller (RNC) node to the second radio network controller (RNC) node.

5. The method of claim 4, wherein the performing of the second stage connection combining operation comprises the second radio network controller (RNC) node combining same-numbered frames from a plurality of base stations of the second set to yield a resultant frame, and wherein the performing of the first stage connection combining operation comprises first radio network controller (RNC) node combining the resultant frame with a same-numbered frame from at least one of the base stations of the first set.

6. The method of claim 4, the performing of the first stage connection splitting operation comprises the first radio network controller (RNC) node forwarding copies of the frame received from a mobile switching center to at least one of the base stations of the first set and a single copy of the frame to the second radio network controller (RNC) node, and wherein the performing of the second stage connection splitting operation comprises the second radio network controller (RNC) node forwarding copies of the frame received from the first radio network controller (RNC) node to a plurality of base stations of the second set.

7. A mobile telecommunications system handling a mobile connection between a mobile switching center and plural base stations involved in the mobile connection, the system comprising:
    a first radio network controller (RNC) node serving a first base station, the first radio network controller (RNC) node having a diversity handling unit;
    a second radio network controller (RNC) node serving a second base station, the second radio network controller (RNC) node having a diversity handling unit;
    an inter-control node link connecting the first radio network controller (RNC) node and the second radio network controller (RNC) node;
    wherein when a particular mobile connection involves the first base station and the second base station, both the diversity handling unit of the first radio network controller (RNC) node and the diversity handling unit of the second radio network controller (RNC) node are utilized for the particular mobile connection, and wherein the inter-control node link carries one of a connection combining result from the diversity handling unit of the second radio network controller (RNC) node to the diversity handling unit of the first radio network controller (RNC) node and a connection splitting result from the diversity handling unit of the first radio network controller (RNC) node to the diversity handling unit of the second radio network controller (RNC) node.

8. A method of operating a mobile telecommunications system, the method comprising:
    establishing a particular mobile connection between a mobile switching center and a mobile station using a first base station and a second base station, the first base station and the second base station being respectively controlled by a first radio network controller (RNC) node and a second radio network controller (RNC) node;
    utilizing a first diversity handling unit in the first radio network controller (RNC) node and a second diversity handling unit in the second radio network controller (RNC) node for performing combining and splitting functions for the particular mobile connection;

using an inter-control node link connecting the first radio network controller (RNC) node and the second radio network controller (RNC) node for carrying one of a connection combining result from the second diversity handling unit in the second radio network controller (RNC) node to the diversity handling unit in the first radio network controller (RNC) node and a connection splitting result from the diversity handling unit of the first radio network controller (RNC) node to the diversity handling unit of the second radio network controller (RNC) node.

9. The method of claim 8, wherein initially one of the first radio network controller (RNC) node and the second radio network controller (RNC) node performs a first stage combining and splitting function and the other of the first radio network controller (RNC) node and the second radio network controller (RNC) node performs a second stage combining and splitting function, and wherein the method further comprises moving the second stage splitting and combining function to a radio network controller (RNC) node other than the radio network controller (RNC) node which initially performed the second stage combining and splitting function.

10. The system of claim 1, wherein the first stage connection combining operation performed at the first radio network controller (RNC) node utilizes the second stage connection combining result carried on the inter-control node link.

11. The method of claim 4, further comprising using the second stage connection combining result carried on the inter-control node link in the first stage connection combining operation performed at the first radio network controller (RNC) node.

* * * * *

UNITED STATES PATENT AND TRADEMARK OFFICE
CERTIFICATE OF CORRECTION

PATENT NO. : 6,246,878 B1          Page 1 of 1
DATED : June 12, 2001
INVENTOR(S) : Wallentin It is certified that error appears in the above-identified patent and that said Letters Patent is hereby corrected as shown below:

<u>Title page,</u>
Item [54], please correct the following:
-- [54] MULTISTAGE DIVERSITY HANDLING FOR CDMA MOBILE TELECOMMUNICATIONS --

Signed and Sealed this

Fifteenth Day of January, 2002

*Attest:*

JAMES E. ROGAN
*Attesting Officer*    *Director of the United States Patent and Trademark Office*